June 6, 1939.  J. G. STRANDBERG  2,161,689
MACHINE FOR CUTTING AND FASTENING HELICAL SPRINGS
Filed Sept. 10, 1938   4 Sheets-Sheet 1
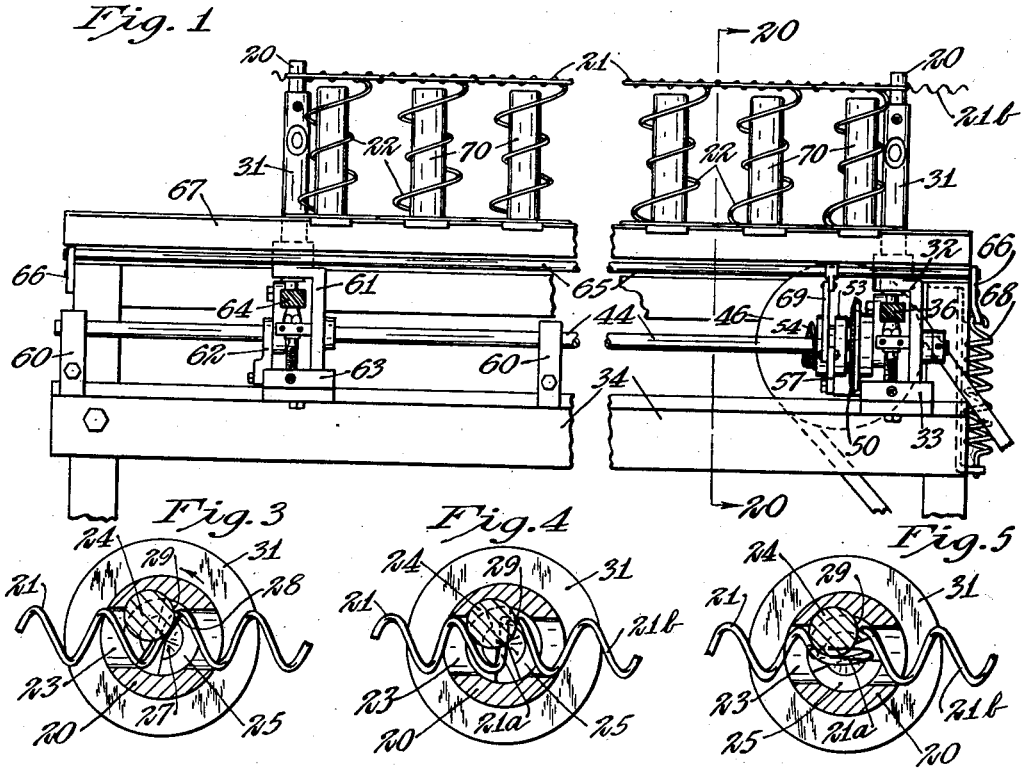
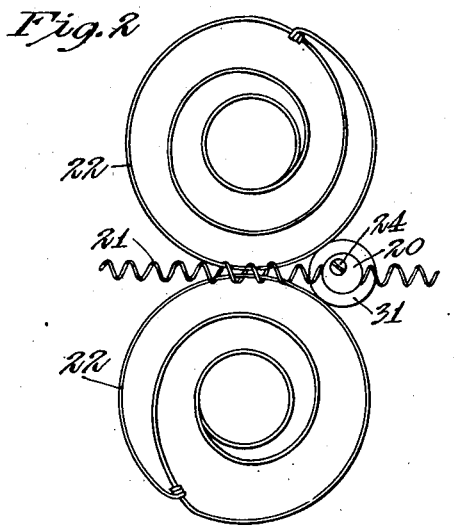
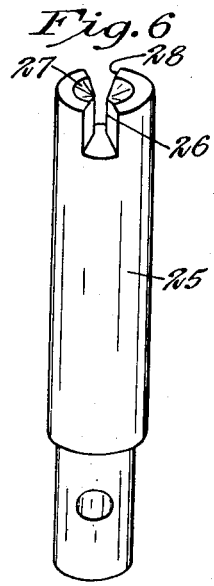
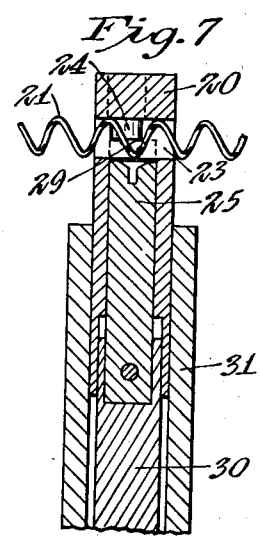
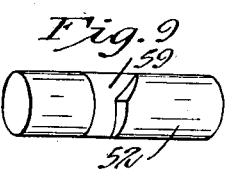
Inventor
Joel G. Strandberg
By Stryker & Stryker
Attorneys

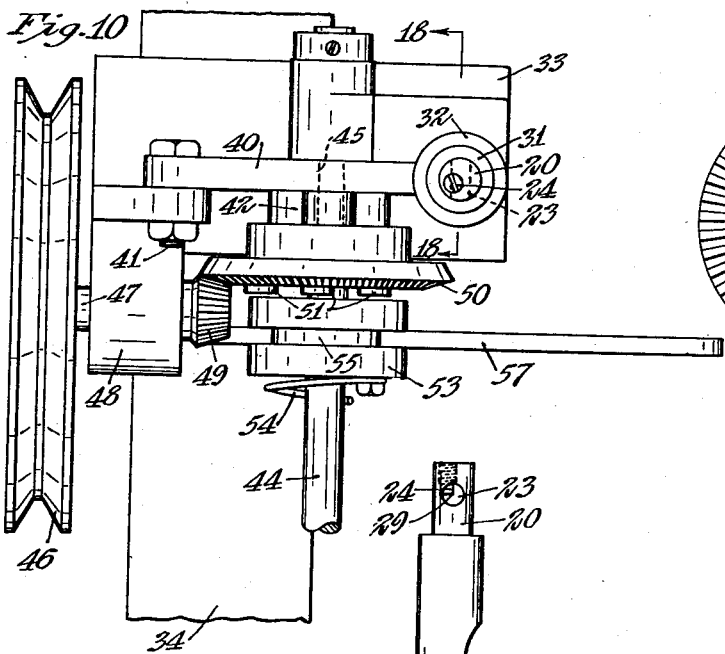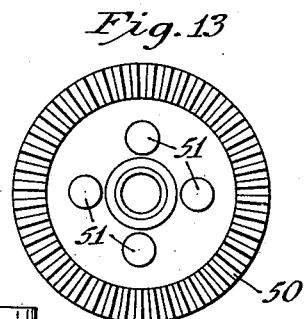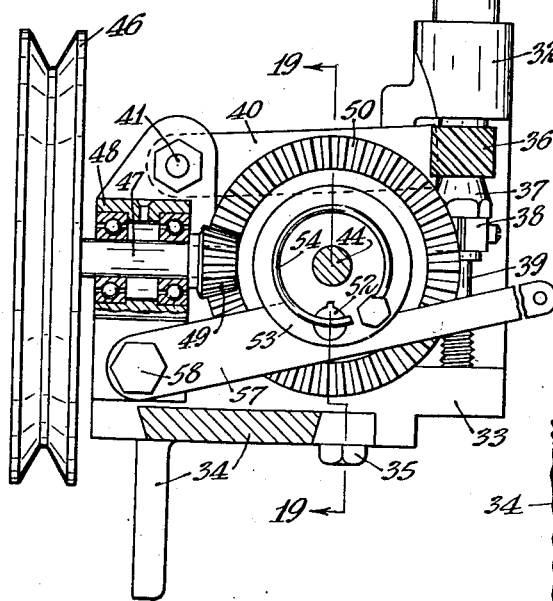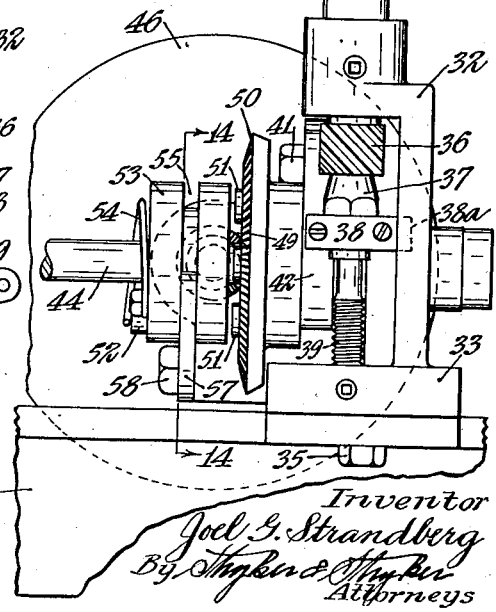

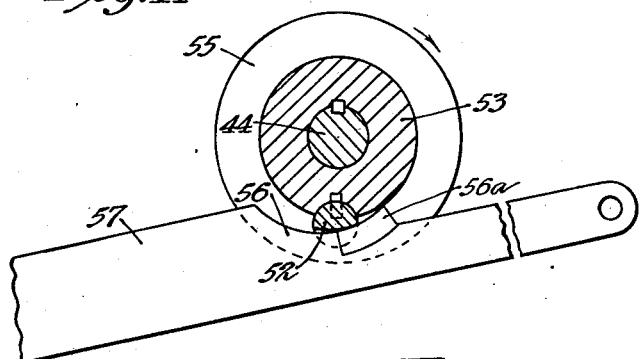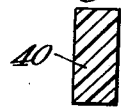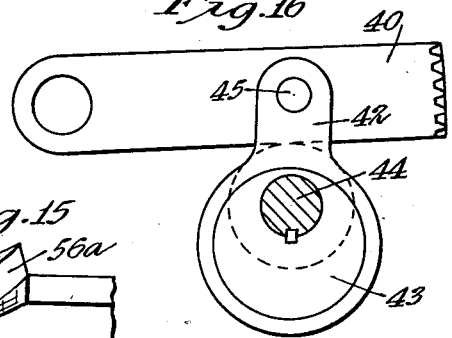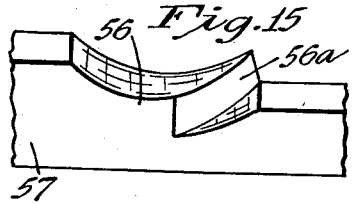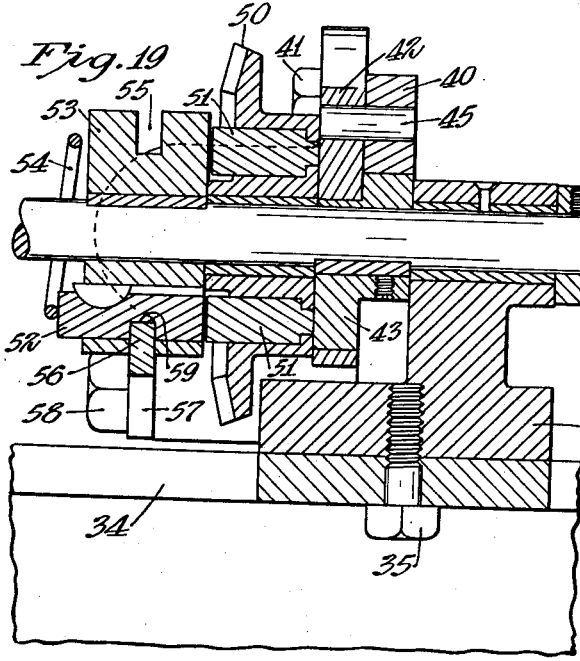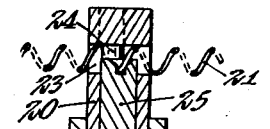

June 6, 1939.  J. G. STRANDBERG  2,161,689

MACHINE FOR CUTTING AND FASTENING HELICAL SPRINGS

Filed Sept. 10, 1938  4 Sheets-Sheet 4

Inventor
Joel G. Strandberg
By Strykee & Stryker
Attorneys

Patented June 6, 1939

2,161,689

UNITED STATES PATENT OFFICE 2,161,689

MACHINE FOR CUTTING AND FASTENING HELICAL SPRINGS

Joel G. Strandberg, St. Paul, Minn., assignor to The United States Bedding Company, St. Paul, Minn., a corporation of Minnesota Application September 10, 1938, Serial No. 229,300

14 Claims. (Cl. 140—3)

In the manufacture of certain types of bed springs and inner springs for mattresses it is common practice to secure rows of upholstery springs together by weaving helical wires into engagement with the adjoining coils of the springs. Upon the completion of the weaving operation it has been necessary heretofore to manually cut and shape or reverse the ends of the helical wires so that they are properly fastened and to guard the sharp ends.

It is an object of this invention to provide a novel machine for cutting and reversing or fastening the ends of helical wires.

Another object is to provide a machine of this class with mechanism for quickly and simultaneously finishing both ends of a helical wire in proper relationship to rows of upholstery springs which are joined together by such wire.

A further object is to provide a novel guide for a helical wire and a power-driven cutter arranged to coact with the guide in cutting the wire to the proper length and also to so bend the end of the wire that it is fastened and guarded.

Other objects will appear and be more fully pointed out in the following specification and claims.

The invention will be best understood by reference to the accompanying drawings in which:

Figure 1 is a front elevation of my machine mounted on an assembling table for upholstery springs;

Fig. 2 is a plan view on a larger scale showing one of my cutter heads in its normal position with reference to the upholstery springs and helical wire;

Figs. 3, 4 and 5 are horizontal sections through the upper portion of the cutter head showing the cutter respectively in three of its successive positions as in operation;

Fig. 6 is a perspective view of the cutter;

Fig. 7 is a central vertical section through the cutter and cutter head and showing a portion of helical wire in the guide;

Fig. 8 is a side elevation of the finished end of the wire;

Fig. 9 is a perspective view of the clutch pin;

Fig. 10 is a plan view of one of the cutter heads and operating mechanism;

Fig. 11 is a part end view and part vertical section through the assembly shown in Fig. 10;

Fig. 12 is a front elevation of said assembly;

Fig. 13 is an end view of the bevel gear;

Fig. 14 is a cross section through the clutch taken on the line 14—14 of Fig. 12;

Fig. 15 is a perspective view of the clutch cam;

Fig. 16 is a side view of the helical gear segment and eccentric for operating the same;

Fig. 17 is an elevation of the toothed end of the helical gear segment;

Fig. 18 is a central vertical section through the cutter head and cutter assembly, taken on the line 18—18 of Fig. 10 and with the cutter in operating position with reference to a helical wire;

Fig. 19 is a section taken on the line 19—19 of Fig. 11, and

Figure 20:
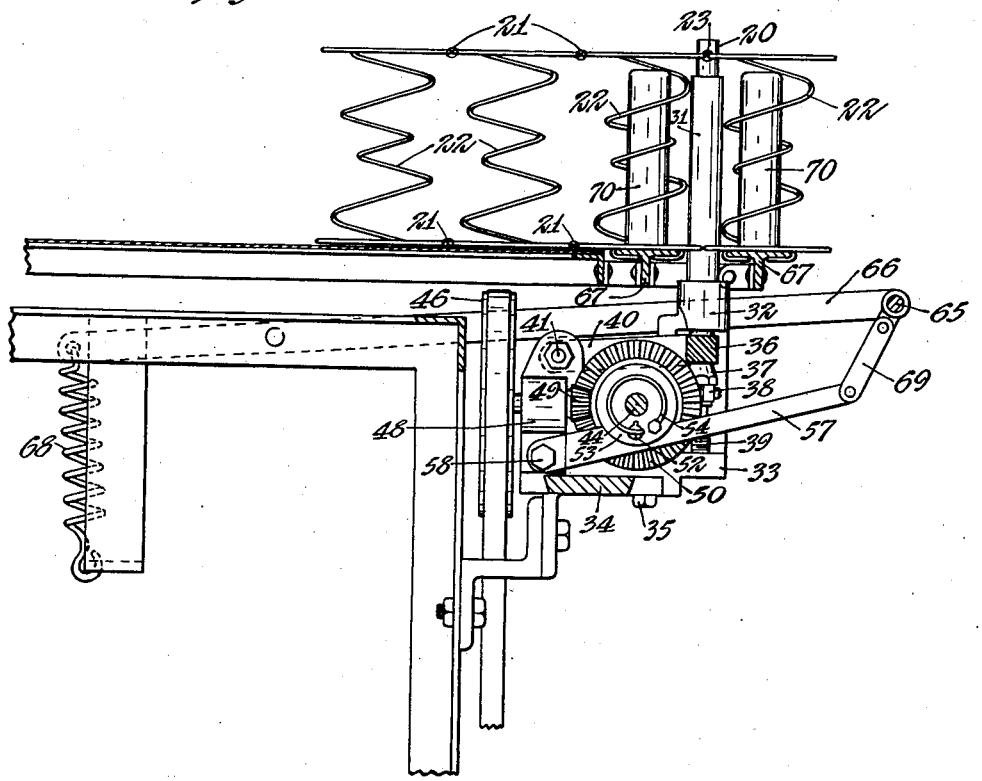
Fig. 20 is a section taken on the line 20—20 of Fig. 1.

My machine has a pair of cutter heads 20 projecting upward in parallel relation to each other to receive a helical wire 21 as it is fed by rotary and longitudinal movement into engagement with rows of upholstery springs 22, as illustrated in Figs. 1, 2 and 20. One of these cutter heads is movable to and from the other, as hereinafter more fully described, to adjust the machine to receive spring assemblies of various lengths.

Each cutter head has near its upper end a cylindrical guide opening 23 to receive the helical spring 21 and projecting down into the opening 23 from the upper end of the head is a pin 24. This pin is disposed eccentrically to the vertical axis of the cutter head and projects into the guide opening 23 approximately to its axis. The pin 24 and the opening 23 are so arranged that the wire 21 must be rotated about its axis to extend it through the passage 23 and to align the convolution of the spring within the guide with a slot 26 formed in a cutter 25. As shown in Figs. 3 to 7 and 18, the cutter 25 is disposed axially within the cutter head and is movable up into the passage 23 to receive approximately the lower half of one of the convolutions of the wire 21 in the slot 26. The narrowest point of the slot 26 is located at the center of the cutter and from this point the slot flares toward opposite peripheries to a degree corresponding to the pitch of the wire to be cut. A concentric countersink 27 is formed in the upper end of the cutter to guide the wire 21 into the slot 26. The cutter 25 has an edge 28 which coacts with an edge 29 formed on the pin 24 to sever the wire 21, as best shown in Fig. 4.

By the mechanism hereinafter described, the cutter 25 is moved upward in the vertical bore of the head to engage the lower end of the pin 24 with the upper end of the cutter. This causes the lower part of the wire 21 in the opening 23 to be engaged in the slot 26, as shown in Figs. 3 and 18, whereupon the cutter is rotated about its axis to sever the wire, as indicated in Fig. 4, and then bend the end portion 21a backward upon itself to form a closed loop, as indicated in Figs. 5 and 8. The short, severed end portion 21b is waste and merely falls from the cutter head and the finished end portion 21a is merely withdrawn from the cutter head when the spring assembly is removed.

As shown in Figs. 7 and 18, the cutter 25 is secured to the upper end of a shaft 30 and the cutter head 20 is fixed on the upper end of a housing 31 enclosing the shaft 30. This housing is rigidly mounted on a frame member 32 which is integral with a base plate 33 adapted to be fixed on a horizontally extending beam 34 of a spring assembling table, a bolt 35 being employed to clamp the base plate 33 in place. A small helical gear 36 is fixed on the shaft 30 and below this gear the shaft is provided with a nut 37 which is held in the embrace of a friction clamp 38 having an arm 38a projecting therefrom to slidably engage the frame member 32. This friction clamp is provide to prevent the shaft 30 and cutter from being rotated by momentum beyond the proper position for engagement with the helical wire 21 in the opening 23. A stud 39 is mounted in axial alignment with the shaft 30 beneath the lower end thereof, this stud being threaded in the base 33 and affording an adjustable stop for downward movement of the shaft 30 and cutter. The upper end of the stud 39 fits into an axial recess in the friction nut 37.

The helical gear 36 is arranged to be actuated by a gear segment 40 pivoted on a pin 41 (Figs. 10, 11 and 16) to oscillate in a vertical plane. To actuate the segment 40 I provide an eccentric 43 fixed on a horizontal shaft 44 and link 42 pivotally connected to the segment 40 by a pin 45, as shown in Figs. 16 and 19.

Power for driving the machine is transmitted from an electric motor (not shown) to a pulley 46 fixed on a shaft 47. As shown in Figs. 10 and 11, this shaft has a suitable anti-friction bearing in a frame member 48 and a bevel pinion 49 is secured to the shaft 47 for driving a bevel gear 50 (see also Figs. 12, 13 and 19). The gear 50 is normally free to rotate on the shaft 44 and has projecting from one face a plurality of spaced and rigid pins 51 for engagement with a movable clutch pin 52 which is mounted on a clutch member 53 keyed to the shaft 44 (Figs. 9 and 14). A spring 54 mounted on the outer face of the member 53 presses the pin 52 toward the gear 50 and the periphery of the member 53 has an annular groove 55 to receive a cam portion 56 of a clutch lever 57. One end of this lever is pivotally supported on the frame by a bolt 58 and the other or free end is arranged to be actuated to move the cam portion 56 to and from engagement with a cam groove 59 in the pin 52 (Figs. 9, 14 and 19).

The lever 57 is spring pressed upward so that the cam portion 56 normally engages the pin 52 in the groove 59 and thereby retains this pin out of engagement with the pins 51 on the bevel gear 50 against the action of the spring 54. When a helical wire is to be cut and formed at its ends the lever 57 is actuated downward to withdraw the cam 56 from engagement with the pin 52 whereupon the spring 54 actuates this pin to thrust it between a pair of fixed pins 51 on the gear 50. Further rotation of this gear is transmitted through the pins 51 and 52 and clutch member 53 to the shaft 44 so that the latter is rotated until the cam portion 56 of the lever 57 is again allowed to enter the groove 59 of the pin 52. In the normal operation, the gear 50 is continuously driven so that it drives the clutch member 53 in the direction indicated by an arrow in Fig. 14 and, as best shown in Fig. 15, the cam portion 56 of the lever 57 has a wedge shaped end 56a which forces its way into the cam groove 59 in the pin 52 at the end of one complete revolution when the lever has been raised by its actuating spring. The lever 57 is depressed momentarily when a wire 21 is to be cut and formed and by the connections described, the shaft 44 is turned one complete revolution before being disengaged from the driving gear 50 and stopped by the friction clamp 38.

In the machine shown in Figs. 1 and 20, a single shaft 44 is arranged to drive a pair of the cutters. This shaft extends in parallel relation to the rows of upholstery springs 32 to be joined together and is supported on the frame member 34 in suitable bearing brackets 60. A duplicate 61 of the frame member 32 is provided to support the second cutter unit which is actuated by a duplicate of the eccentric 43. The latter is slidable along the shaft 44 and is splined thereto adjacent to the frame member 62 secured to a base plate 63 supporting the frame member 61. The duplicate of the eccentric 43 is arranged to actuate a gear segment (like the segment 40) engaging a helical gear 64 for driving the duplicate cutter. The base plate 63 may be secured to the frame member 34 at various distances from the base plate 33 corresponding to the lengths of the spring assemblies to be accommodated in the machine.

For convenience in operating the clutch from any position of an operator along the machine, I provide a clutch handle consisting of a long rod 65 extending parallel to the shaft 44 and supported on the free ends of lever arms 66. These arms are pivotally connected to the main frame 67 of the assembling machine and the rod 65 is normally held in elevated position by a spring 68. A link 69 connects the rod 65 to the free end of the clutch lever 57. Rows of cylindrical holders 70 are provided to receive the upholstery springs 22 in the machine illustrated.

In operation the gear 50 is continuously driven by power applied to the pulley 46 and the helical wire 21 is fed by rotary and longitudinal movement through the guide opening 23 of one of the cutter heads and then successively about the adjoining coils of pairs of the upholstery springs 22. The wire 21 is finally fed through the guide opening 23 of the second cutter head and then the operator depresses the rod 65 momentarily to simultaneously actuate both cutters. When this rod is depressed the link 67 actuates the clutch lever 57 downward so that the clutch pin 52 is freed and is thrust by the spring 54 into engagement with one of the pins 51 projecting from the beveled gear 50. As this gear is continuously driven, the rotary motion is now transmitted through the clutch member 53 to the shaft 44 so that the latter is turned one complete revolution. The eccentric 43 and its duplicate on the shaft 44 are thus caused to oscillate the gear segment 40 and its duplicate. These segments first raise the helical gears 36 and 64 carrying the shafts 30 and cutters 25 into the guide openings 23 so that the cutters are projected in the heads 20 to the point where the upper ends of the cutters strike the eccentric pins 24. Further upward movement of the gear segment 40 and its duplicate causes the shafts 30 carrying the cutters 25 to rotate through an angle sufficient to first sever the end portions 21b of the wires 21, as indicated in Fig. 4, and then to form the closed end loops 21a, as shown in Figs. 5 and 8. During the downward stroke of the gear segments, which immediately follows, the cutters 25 and shafts 30 are returned downward and then are rotated to their starting positions where the cutter slots 26 are in position to engage another helical wire. At the end of one complete revolution of the shaft 44 the wedge-shaped end 56a of the cam portion 56 engages in the groove 59 of the pin 52 to withdraw the clutch pin 52 from engagement with the driving gear 50. Upon completion of the cutting and forming of the ends 21a of the wires 21, these ends are withdrawn from the guide openings 23 in the cutter heads.

In accordance with the usual procedure the operation is repeated after placing another pair of rows of the upholstery springs 22 in alignment with the guide openings 23 in the cutter head. My invention materially reduces the cost of the spring assemblies and performs the cutting and bending operation more uniformly and rapidly than has heretofore been possible.

It is well known in this art that various types of assembling tables for upholstery springs and helical wires are available and in use and that machines of various types for feeding or weaving the helical springs into engagement with the upholstery springs are also in commercial use. My invention may be used with any of the common types of such machines.

Having described my invention, what I claim as new and desire to protect by Letters Patent is:

1. In combination with an assembling table for upholstery springs to be joined together by a helical wire, said table having parallel rows of holders for said springs, a pair of cutter heads disposed near the ends of said rows and having aligned passages to receive a helical wire joining the springs on said holders together, cutters movable in said passages respectively to simultaneously trim and reverse the end portions of said wire by rotary motion continuously in one direction, power-driven means for actuating said cutters to trim and reverse the end portions of said wire and to return said cutters to initial wire-receiving position, and a manual control for said power-driven means.

2. In combination with an assembling table for upholstery springs to be joined together by a helical wire, a pair of cutter heads mounted near opposite ends of said table, said heads being formed with aligned passages to receive a helical wire joining said springs together, cutters movable in said heads to project into said passages respectively and to simultaneously coact with said heads to trim and reverse the ends of said wire by rotary motion continuously in one direction, power-driven means for actuating said cutters to trim and reverse the ends of said wire and a manual control for said power-driven means.

3. In combination with an assembling table for upholstery springs to be joined together by a helical wire, a pair of cutter heads mounted near opposite ends of said table, said heads being formed with passages to receive a helical wire joining said springs together, rotary and axially movable cutters in said heads adapted to be moved axially to project into said passages respectively and to simultaneously engage said wire near its ends and power-driven means for moving said cutters axially and then rotating them to trim the ends of said wire.

4. In combination with an assembling table for upholstery springs to be joined together by a helical wire, a pair of cutter heads mounted near opposite ends of said table, said heads being formed with passages to receive a helical wire joining said springs together, cutters movable relative to said heads and crossways of the wire in said passage to project into said passages respectively and revoluble therein to simultaneously trim the ends of said wire and reverse the end portions thereof, power-driven means for actuating said cutters to trim and reverse said ends and a manual control for said power-driven means.

5. In a machine of the class described, a cutter head formed with a guide passage for a helical wire, a rotary cutter normally retracted from said passage and movable relative to said head to project into said passage and to engage a helical wire therein, said cutter and head being formed to coact in severing said wire and reversing the end thereof by rotary motion of the cutter continuously in one direction and power-driven means for rotating said cutter to sever and reverse the end of said wire in said passage.

6. In a machine of the class described, a cutter head formed with an opening to receive a helical wire, a cutter movable crossways of the axis of said wire in said opening to engage a portion of a convolution of said wire therein, means in said opening for guiding said wire in predetermined, fixed relation to said cutter and means for rotating said cutter in said opening to sever said wire and form a reverse bend in said portion of a convolution thereof.

7. In a machine of the class described, a cutter head formed with an opening to receive a helical wire, a cutter revoluble in said head and formed with a slot to receive a portion of a convolution of the wire in said opening, said cutter being normally retracted from said opening, means projecting into said opening between the convolutions of said wire, said means affording a stop for limiting movement of said cutter into said opening and means for actuating said cutter into said opening and for rotating said cutter in said opening to sever said wire and form a reverse bend in the end portion thereof.

8. In a machine of the class described, a cutter head formed with a cylindrical passage for a helical wire, a cutter revoluble in said head and formed with a slot to receive a portion of a convolution of the wire in said passage, stop means projecting into said passage between the convolutions of said wire to a point substantially at the axis of said passage for limiting movement of said cutter to said point and means for rotating said cutter in said opening to sever said wire and form a reverse bend in the end portion thereof.

9. In a machine of the class described, a cutter head formed with intersecting, cylindrical passages respectively for a helical wire and a rotary cutter, a rotary cutter movable axially in one of said passages to project into the other passage and to engage a wire therein, cutting edges formed on said cutter and head to sever a helical wire between them and power-driven means for moving said cutter axially and for rotating it to sever said wire in the passage containing the same.

10. In a machine of the class described, a cutter head formed with intersecting, cylindrical passages respectively for a helical wire and a rotary cutter, a cutter movable in one of said passages to project into the other passage substantially to the axis of the latter, said cutter being formed with a slot to receive a portion of a convolution of a wire in said passage, cutting edges formed on said cutter and head to sever a helical wire between them, fixed means for confining the end portion of said wire in said slot during the rotation of said cutter and power-driven means for moving said cutter axially and for rotating it to sever said wire and form a reverse bend in the end portion thereof in the passage containing the same.

11. In a machine of the class described, a cutter head formed with an axial bore for a rotary cutter and a transversely disposed passage intersecting said bore to receive a helical wire, a guide for said wire projecting into said passage eccentrically to said bore and opposite to the same, a rotary cutter slidable in said bore to engage the projecting end of said guide, said cutter being formed with a slot to receive a portion of a convolution of a wire in said passage and said cutter and guide being formed with coacting cutting edges to sever said wire and having coacting surfaces to bend the severed end portion of said wire back upon itself adjacent to the inner end of said guide and power-driven means for projecting said cutter into engagement with the wire in said passage and for rotating said cutter therein to cut and bend an end portion of the wire.

12. In a machine of the class described, a cutter head formed with an axial bore for a rotary cutter and a transversely disposed passage intersecting said bore to receive a helical wire, a stud fixed in said head and projecting into said passage eccentrically to said bore and in parallel relation thereto, said stud projecting to the axis of said passage, a rotary cutter slidable in said bore to engage the inner end of said stud, said cutter being formed with a slot extending across its end opposite said stud to receive a portion of a convolution of a wire in said passage, said cutter and stud being formed with coacting cutting edges extending crossways to the axis of said cutter and power-driven means for projecting said cutter into engagement with the inner end of said stud and for rotating said cutter in said passage to cut said wire and form a reverse bend therein near its end.

13. In a machine of the class described, a cutter head formed with a passage for a helical wire, a rotary cutter movable axially in said head to project into said passage and formed to engage said wire therein, a rotary and longitudinally movable shaft for actuating said cutter secured thereto in axial continuation thereof, a helical gear fixed on said shaft, a gear segment in mesh with said gear and extending in a common plane with the axis of said shaft and power-driven means for oscillating said gear segment to turn said shaft and actuate it longitudinally.

14. In a machine of the class described, a cutter head formed with a cylindrical passage for a helical wire, a guide member projecting into said passage from one side part way toward the other, a rotary cutter mounted in said head opposite said guide member and movable to project into said passage to engage a wire therein, said cutter and member having coacting cutting edges extending crossways to the axis of rotation of said cutter for severing a wire in said passage, a rotary and longitudinally movable shaft for actuating said cutter disposed in axial continuation of the cutter, a helical gear fixed on said shaft, a helical gear segment in mesh with said gear and disposed to oscillate in a common plane with the axis of said shaft and power-driven means for oscillating said gear segment to turn said shaft and actuate it longitudinally to and from a wire in said passage.

JOEL G. STRANDBERG.